Sept. 1, 1931.  J. B. LADD  1,821,652
NUT LOCK
Filed Dec. 19, 1929
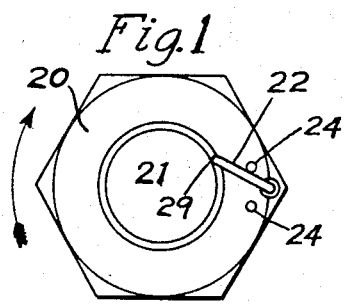
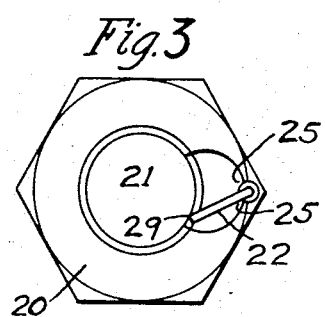
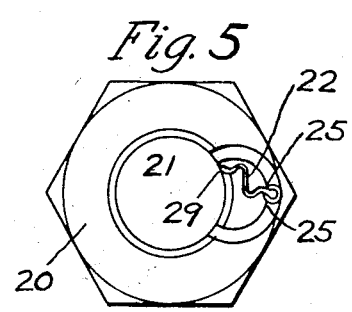
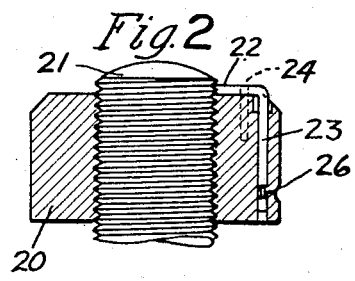
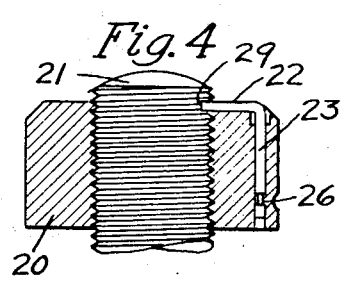
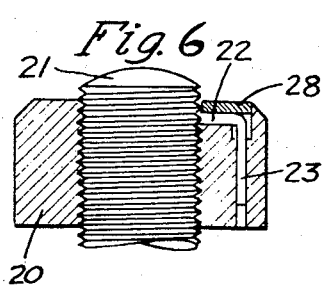
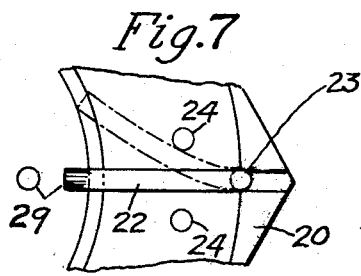
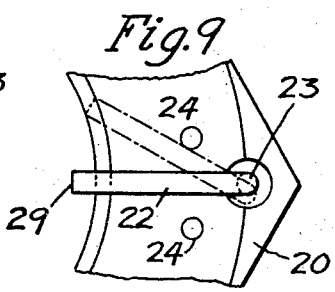
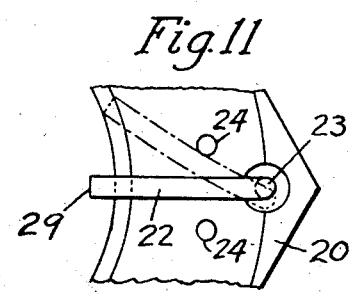
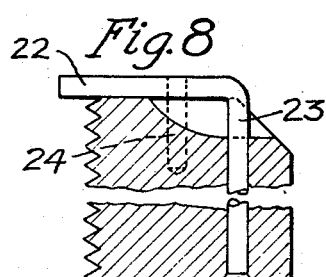
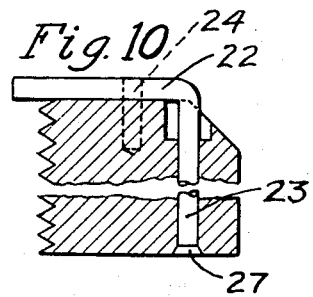
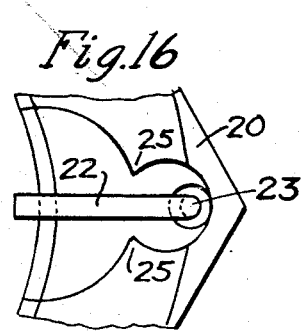
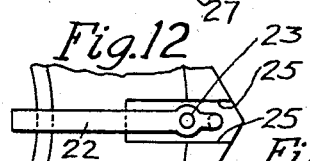
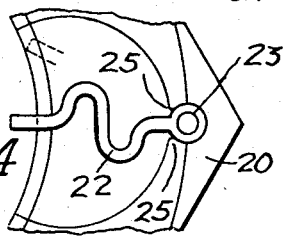
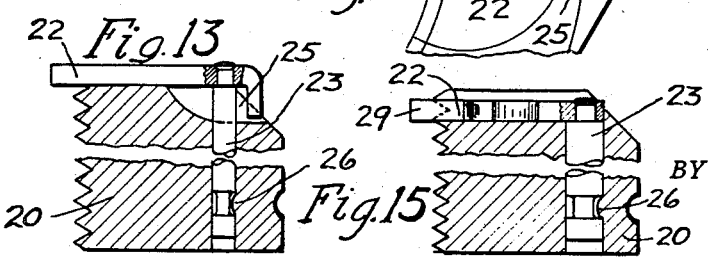
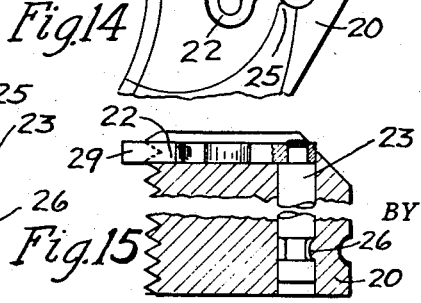
INVENTOR
James B. Ladd
BY
ATTORNEY Patented Sept. 1, 1931

1,821,652

UNITED STATES PATENT OFFICE

JAMES B. LADD, OF ARDMORE, PENNSYLVANIA; MERRILL A. KERCHER EXECUTOR OF SAID JAMES B. LADD, DECEASED

NUT LOCK

Application filed December 19, 1929. Serial No. 415,211.

This invention relates to means for locking cooperating threaded elements, such as a nut to a bolt, for the purpose of holding the nut from working loose, and refers particularly to means for holding a nut against rotation in either direction up to a predetermined rotary torque.

One of the objects of the invention is to provide an improved construction of the locking means and to have same entirely within the nut with no part exposed to injury from contact with other nuts or the like, either before or after being put in service.

Another object of the invention is to provide locking means so constructed as not to be subjected to torsional strains.

A further object is to provide locking means which will be simple and inexpensive and which will not require extreme accuracy of parts.

Other objects and advantages of the construction will be seen from the description following and the accompanying drawings, which illustrate, merely by way of example, suitable embodiments of the invention.

Fig. 1 is a plan view of a nut on a bolt with a locking pawl.

Fig. 2 is a part section and part elevation of the device shown in Fig. 1.

Fig. 3 is a plan view showing a modification.

Fig. 4 is a part section and part elevation of the structure shown in Fig. 3.

Fig. 5 is a plan view showing a further modification with the cover 28 shown in Fig. 6 removed.

Fig. 6 is a part section and part elevation of the structure shown in Fig. 5 with the cover 28 in place.

Fig. 7 is a fragmentary plan view, on an enlarged scale, of another modification, and shows in dotted lines an exaggeration of the flexure of the pawl.

Fig. 8 is a part section and part elevation of the device shown in Fig. 7.

Fig. 9 is a fragmentary plan view on an enlarged scale of the pawl shown in Fig. 1, and shows an exaggeration of the flexure of the pin when a rigid pawl is used.

Fig. 10 is a part section and part elevation of the device shown in Fig. 9.

Fig. 11 is a plan view on an enlarged scale of the pawl shown in Fig. 1, and shows an exaggeration of the flexure which may occur in both the pawl and the pin.

Fig. 12 is a fragmentary plan view on an enlarged scale of another modification.

Fig. 13 is a part section and part elevation of the device shown in Fig. 12.

Fig. 14 is a fragmentary plan view on an enlarged scale of another modification.

Fig. 15 is a part section and part elevation of the device shown in Fig. 14.

Fig. 16 is a fragmentary plan view on an enlarged scale of another modification.

Similar numerals refer to similar parts throughout the several views.

Broadly described, my invention comprises a pawl 22 rigidly connected with a pin 23, rotatably secured in a nut. The pawl is adapted to move angularly with respect to the axis of the nut and is so located and confined that, when the nut is turned onto the bolt the free end of the pawl will be brought into forcible contact with the thread on the bolt and will resist the rotation of the nut in the reverse direction up to a predetermined torque, and will yield, when the torque is increased above the predetermined amount, to be moved angularly by the reverse rotation of the nut into a position in which it will resist the rotation of the nut in the opposite direction.

In general, when the nut 20, with my locking device, is put on a bolt 21 with a right-hand thread, the pawl 22 will automatically be brought into the position in which it is shown in Fig. 1, by the rotation of the nut in the direction of the arrow shown, and if the nut is forcibly turned in the reverse direction, the pawl will be moved across the radial line into the position in which it is shown in Fig. 3.

When the pawl is at the limit of its free angular movement, in either direction, its free end 29 extends into the threaded hole or bore of the nut, and when the nut is rotated onto the bolt, said free end is forced beyond said free angular position and is brought into forcible contact with the thread on the bolt.

In accordance with my invention the pin 23 is always free to rotate in its seat, and the pawl is always free to move with the pin through a slight angle to and from either side of a radial line drawn through the axis of the pin and the center of the nut, but is always positively limited by suitable abutments such as 24 shown in Figs. 1, 2, 7, 8, 9 and 10, or by margins 25 formed in a recess in the bolt such as shown in Figs. 3, 5, 12, 13 and 14.

When the nut has been rotated on the bolt in the direction of the arrow, as in Fig. 1, and the pawl is forcibly in contact with the thread in the bolt, it is evident that if the nut is rotated in the reverse direction the pawl must pass a radial position in passing over to the position shown in Fig. 3, and therefore, to permit the pawl to be forced by the rotation of the nut from the position shown in Fig. 1 to the position shown in Fig. 3, it is essential that the pawl must be shortened lengthwise if the pin is rigid, or a portion of the pin 23 must be moved by flexure away from the bolt, if the pawl is rigid and does not yield to the compressive strain upon it.

This final movement, beyond its free angular movement, causes flexure of the pawl when a flexible pawl is used and the pin is confined against moving circumferentially relative to the axis of the nut, as shown exaggerated in Fig. 7.

When a rigid pawl is used and the upper part of the pin is free to move circumferentially relative to the axis of the nut, this final movement causes flexure of the pin, as shown exaggerated in Fig. 9.

When a flexible pawl is used and the upper part of the pin is free to move circumferentially relative to the axis of the nut, this final movement causes flexure of both the pawl and the pin, as shown exaggerated in Fig. 11.

When a rigid pin, such as shown in Fig. 15, is used, a shortening of the pawl is obtained by using a pawl of resilient material which will yield to compression in the direction of its length and will also yield to flexure with respect to its longitudinal extension, such as shown in Fig. 14.

Particular attention is called to the pawls shown in Figs. 5 and 14, as such pawls are of resilient material adapted to yield to compressive strain in direction of their length, and also to yield by flexure to the transverse strain to which they will be subjected when their free ends are forced past the extremes of the free angular motion permitted. It will also be noted that the combined resilience of the pawl and of its pin may be utilized, as in Fig. 11.

The free end of the pawl, which contacts with the thread on the bolt is preferably of a cylindrical form, as shown in Fig. 7, but may be of any form adapted to holding the nut against rotation, either by friction or by biting into the thread, or both.

The pin 23 is fastened so that it cannot work out of its seat, as by means such as shown at 26, in Figs. 2, 4, 13 and 15, or at 27 in Figs. 8 and 10, or it may be held in by a cover such as 28 shown in Figs. 5 and 6, which is used when it is desired that the device be fully enclosed.

What I claim is:—

1. A device for locking a nut to a bolt or the like comprising a pawl, to one end of which is rigidly attached or integrally formed a pin at a right angle therewith, said pin being free to rotate in a seat formed in the nut with its axis substantially parallel with the axis of the nut, the pawl extending from said pin into the bore of the nut and free to move through a small angle to either side of the radial position, and means coacting with the pawl to limit said free angular movement, said limiting means causing the free end of the pawl to forcibly engage the thread on the bolt when the pawl is moved by rotation of the nut beyond either limit of its free angular motion.

2. A device for locking a nut to a bolt or the like comprising a pawl, to one end of which is rigidly attached or integrally formed a pin at a right angle therewith, said pin being free to rotate in a seat formed in the nut with its axis substantially parallel with the axis of the nut, the pawl extending from said pin into the bore of the nut and free to move through a small angle to either side of the radial position, and means coacting with the pawl to limit said free angular movement, said limiting means causing the free end of the pawl to forcibly engage the thread on the bolt when the pawl is moved by rotation of the nut beyond either limit of its free angular motion, and means permitting the free end of the pawl to move toward the main axis of the pin, when the nut is forcibly rotated in the reverse direction, to permit the pawl to be turned angularly past a radial position relative to the nut to engage the thread on the bolt on the opposite side to resist rotation of the nut in the reverse direction.

3. In a device as defined in claim 1, means whereby the free end of the pawl is permitted to move toward the main axis of the pin by flexure of the pin.

JAMES B. LADD.